June 6, 1961 N. H. SHERWOOD 2,987,421
COMPOSITION FOR TREATING TEXTILE MATERIALS, METHOD, AND
ARTICLE PRODUCED THEREBY
Filed Sept. 19, 1955
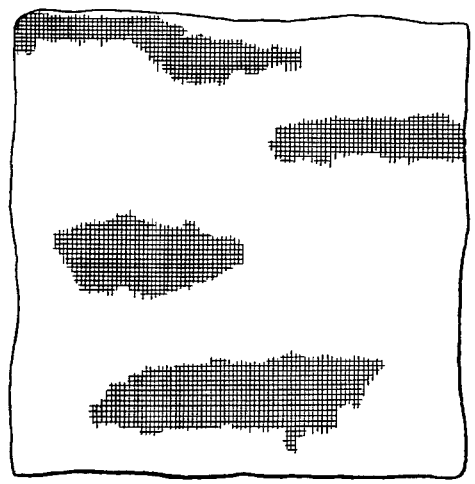
TEXTILE MATERIAL CONTAINING AN
UREA-ALDEHYDE RESIN AND AN
ELASOMERIC ACRYLATE HOMOPOLYMER,
ACRYLATE COPOLYMER, OR AN INTERNALLY
PLASTICIZED VINYL HALIDE COPOLYMER
OR MIXTURE THEREOF TO MAKE IT
CREASE RESISTANT.
INVENTOR.
NEIL H. SHERWOOD
BY
ATTY.

United States Patent Office

2,987,421
Patented June 6, 1961

2,987,421
COMPOSITION FOR TREATING TEXTILE MATERIALS, METHOD, AND ARTICLE PRODUCED THEREBY
Neil H. Sherwood, Avon Lake, Ohio, assignor to The B. F. Goodrich Company, New York, N.Y., a corporation of New York
Filed Sept. 19, 1955, Ser. No. 535,264
14 Claims. (Cl. 117—139.4)

The present invention relates to improvements in crease-resistant finishes for textile goods. In particular, this invention relates to improvements in urea-formaldehyde and melamine-formaldehyde type crease-resistant compositions for textiles and related fabrics, to methods for applying said compositions to textiles and to articles of manufacture containing said compositions.

It is known that shrinkage control of textiles such as rayon has been obtained by the use of moderate amounts of urea-formaldehyde and similar resins but good crease-resistance and recovery from wrinkles can be obtained only by the use of large amounts of such resins. Unfortunately, as the resin content is increased, the major physical properties of the resulting treated fabric are decreased as to tensile strength, tear strength and abrasion resistance. Accordingly, it would be highly desirable to control the shrinkage and obtain good crease-resistance and recovery from wrinkles with retention of the physical properties of the cloth when using such resins and, therefore, it is a primary object of this invention to provide improved resin-containing compositions which may be used to provide textiles with good crease-resistance and recovery from wrinkles as well as with retention of or improvement in their tensile strength, tear strength and abrasion resistance.

It is another object of this invention to provide a method for imparting good crease-resistance and recovery from wrinkles to textile materials with a retention of or an improvement in their resulting physical properties.

Another object is to provide an article of manufacture comprising a textile material containing a composition comprising a resin which provides good crease resistance, recovery from wrinkles and improved tensile strength, tear strength and abrasion resistance.

These and other objects and advantages of the present invention will become more apparent to those skilled in the art from the accompanying drawing illustrating a textile fabric treated according to the method of this invention and from the following detailed description and examples.

It has now been discovered that urea and/or melamine-formaldehyde resin fabric treating compositions can be used which not only provide good crease-resistance and recovery from wrinkles but also good physical properties when the composition contains an elastomeric polymer selected from the group consisting of homopolymers of alkyl acrylates, copolymers of alkyl acrylates and at least one other copolymerizable olefin and polymers of internally plasticized vinyl halides. In contrast to previous methods where only the resin was used in large amounts to obtain adequate crease-resistance and recovery from wrinkles, the present invention permits the use of a reduced amount of such resin in combination with the aforementioned polymers. Nevertheless the resulting products are highly crease-resistant and their tearing, breaking and bursting strengths show a marked improvement over the properties exhibited by fabrics treated with only the urea-formaldehyde or melamine-formaldehyde resins. Furthermore, the abrasion resistance of such fabrics is excellent and their tendency to retain chlorine from hypochlorite during laundering is markedly reduced. In fact, the fabrics produced by the method of the present invention exhibit no yellowing after laundering.

The polymeric elastomers are used in the form of latex containing from about 10 to 60% solids. The elastomers can be homopolymers of methyl acrylate, ethyl acrylate, butyl acrylate and similar lower alkyl acrylates or copolymers of these acrylates with from about 10 to 35% by weight of one or more copolymerizable monomers such as acrylonitrile, styrene, methyl methacrylate, and similar materials. These polymers are soft and elastic and exhibit good elongation and recovery. Mixtures of these homo- and co-polymers can be used if desired. Methods of preparing a latex or aqueous dispersion of these polymers are well known to those skilled in the art.

The elastomeric polymer can also be an internally plasticized vinyl halide such as an internally plasticized copolymer of vinyl chloride, vinyl halide or vinyl fluoride. These polymers are prepared by copolymerizing vinyl chloride with vinylidene chloride and methyl acrylate or other acrylate or ethyl acrylate in which the alkyl group of the acrylate contains up to about 8 or 10 carbon atoms. Preferably the alkyl group will contain from 5 to 10 carbon atoms to provide the best plasticity. Examples of the other acrylates can be n-amyl acrylate, n-hexyl acrylate, isoheptyl acrylate, n-octyl acrylate, 2-ethyl hexyl acrylate, nonyl acrylate, and others. The amides of the acrylic acid esters can also be used. These materials can be polymerized together in an amount of about 35 to 90% by weight of the vinyl halide, from 25 to 65% by weight of the alkyl acrylate and from about 2 to 40% by weight of the vinylidene chloride. In place of vinylidene chloride an acrylic nitrile can be used such as acrylonitrile, methacrylonitrile, chloracrylonitrile, or any nitrile or acrylic or an alpha-alkyl or alpha-halo acrylic acid. If desired, the vinylidene chloride or acrylic nitrile can be omitted from the copolymer. Still other monoolefinic monomeric materials copolymerizable with vinyl halides can be used such as isobutylene, acrylic acid, ethylene, 2-chloroethyl vinyl ether, isobutyl vinyl ketone, trichloroethylene and the like. Mixtures of the foregoing polyacrylate and internally plasticized vinyl halide polymers can also be used. These polymers are also soft and elastic, exhibiting good elongation and recovery. They are used in the form of an aqueous disperson or latex containing from about 10 to 60% total solids. Methods of making such disperson or latex are well known to the art.

The resinous component of the composition of this invention is formed by the reaction of an amide and an aldehyde, for example resins formed by the reaction of urea or melamine and formaldehyde. In place of the urea or melamine other amides can be employed such as cyanuramide, cyanoamide, adipamide, dicyanamide, thiourea, semicarbazide, and other amides which will form resinous materials with formaldehyde or aldehydes in the presence of a catalyst. In place of the aldehyde, paraformaldehyde or glyoxal can also be used. The reaction product of hydrazine and dibasic acids can also be used. These amide and aldehyde resin reaction products can be modified with alcohols and also used in this invention. Mixtures of the various resins disclosed herein can likewise be employed. The components of the resin are used in amounts sufficient to form an intermediate reaction product which can be condensed or cross linked in the presence of catalysts and heated to form a resinous material. The resins are used in the form of an aqueous dispersion, or solution, etc. containing from about 8 to 35% by weight of the resinous forming intermediate reaction product.

In preparing the composition of the present invention the elastomeric latex and the resinous solution are mixed together with a catalyst for the resin such as ammonium chloride, magnesium chloride, acetic acid, phosphoric acid, organic salts or other catalysts well known for the above resinous materials. The composition can also contain more or less water if desired depending upon the fluidity desired for coating or impregnating operations or depending upon the pickup of solids desired from the composition.

The composition can also contain minor amounts of dispersing agents such as Santomerse S (salts of a homologous series of substituted aromatic sulfonic acids), pigments, antioxidants, fungicides, and the like which are well known to those skilled in the art.

The relative proportions of the elastomer to the resin in the bath or composition can vary from about 75 to 45 parts by weight of the elastomer to from 25 to 55 parts by weight of the resin, on a dry weight basis. It is preferred, however, for best results to employ them in the ratio, based on dry weight, of from about 50 to 70 parts by weight of elastomer, the balance being the resin.

When utilizing the compositions of the present invention the elastomer latex is mixed with the resinous solution, a catalyst added thereto and a dispersing agent. Additional water can be added or removed to bring the solids content or concentration to the desired level. The composition is then padded onto the fabric or other textile material or the fabric can be passed through a bath of the composition. The fabric can also be dipped in the composition. The operations of padding, dipping, etc. are controlled as to time and temperature and throughput to provide for the desired pickup of the composition on the fabric. After the fabric has been impregnated or coated with the composition disclosed herein, it is then dried and given a short heating period to fuse the resin. After fusing or setting the resin, it can be washed or neutralized and finally dried.

It will be appreciated that the preferred method of operation is to treat the fabric with a bath containing both the resin and the polymeric elastomer in order to reduce operating steps and costs. However, if desired, the resin solution can be padded first onto the fabric, dried, cured, neutralized and the latex of the elastomeric polymer added. Alternatively, the latex can be added first and then the resin composition. Results obtained are generally the same as when the bath contains both the elastomeric polymer and resinous forming material.

While the padding operations can be conducted so as to deposit any amount of the composition on the fabric, it has been found that large amounts of the resin-elastomeric composition reduce the physical properties of the fabric. Very small amounts offer little improvement. Thus, it has been found best to deposit only from about 5 to 20% solids on the fabric and preferably from about 8 to 15% solids of the present composition to provide the best wrinkle recovery and crease resistance coupled with the best physical properties.

Fabrics treated according to the teaching of the present invention have a crease-resistant recovery of at least about 125° and higher before washing and after washing well about 125°. It is well known that a crease-resistant angle of at least 125° is necessary in order for a fabric to exhibit acceptable performance. Moreover, the treated fabrics have from about a 30 to 100% improvement in residual tear strength over a fabric treated with the resin alone, a shrinkage which is about equivalent to that of the resin treated material, a residual bursting strength higher than resin treated materials and an abrasion resistance of about from 5 to 10 times greater than the resin treated material. The textile material treated accordingly to the present invention can be woven or unwoven, in the form of fabric, fibers, felts, yarn, etc., and can be of cotton, rayon, wool, nylon, other natural or synthetic materials and mixtures thereof.

The following examples will serve to illustrate the invention with more particularity to those skilled in the art:

EXAMPLE I

A composition was prepared containing 60 grams of urea-formaldehyde resin (Rhonite R-1, Rohm and Haas, 50% active material), 1.5 g. of an inorganic salt as a catalyst or curing agent for the resin (Catalyst A, Rohm and Haas), 20 ml. Santomerse-S (30% solids) and 137 ml. of a polyethyl acrylate latex containing 50.8% solids. Sufficient water was added to make a 500 ml. batch. The polyethyl acrylate latex particles in the latex had a particle size of about 0.18 micron. The resulting composition had a concentration of about 20% solids. Fabric samples approximately 16.5" x 18" were cut from a bolt of cotton chambray cloth and the warp ends and filling yarns were raveled approximately ⅝" from each edge. The samples were immersed separately in the solution, squeezed, folded in half and then passed through the Butterworth Padder twice at 30# roll pressure. The samples were dried immediately on tenter frames under minimum tension at 212° F.±10° F. for 10 minutes. After drying, they were cured at 300° F.±5° F. for 5 minutes and neutralized immediately in a 0.1% soda ash solution. After washing in the solution which was at a temperature of about 120°, the samples were rinsed, squeezed and ironed dry at the temperature employed for cotton cloth. The samples were then dried at a constant weight at 220° F. and tested. Similar samples were run on compositions containing no polymeric elastomer and on untreated controls. The results of the tests are shown below:

Table

| Bath | Pickup | Residual Breaking Strength, Percent | | Wrinkle Recovery (degrees) [1] | | | |
|---|---|---|---|---|---|---|---|
| | | | | Before Wash | | After Wash | |
| | | Warp | Filling | Warp | Filling | Warp | Filling |
| Untreated Control | | 100 | 100 | 82 | 97 | 84 | 95 |
| UF Resin only | 12.0 | 43.1 | 33.9 | 145 | 151 | 138 | 144 |
| UF Resin-PEA elastomer | 12.8 | 67.2 | 33.8 | 148 | 128 | 144 | 137 |

| Bath | Residual Tear Strength (percent) [2] | | | | Shrinkage (percent) | |
|---|---|---|---|---|---|---|
| | Before Wash | | After Wash | | Warp | Filling |
| | Warp | Filling | Warp | Filling | | |
| Untreated Control | 100 | 100 | 84.2 | 85.2 | −2.5 | +1.9 |
| UF Resin only | 27.6 | 16.7 | 27.6 | 12.5 | 0 | +0.2 |
| UF Resin-PEA elastomer | 42.1 | 22.2 | 42.1 | 25.9 | 0 | +0.3 |

| Bath | Residual Bursting Strength (percent) [3] | | | Abrasion Cycles [4] | |
|---|---|---|---|---|---|
| | Before Wash | After Wash | Hypochlorite Treated | Before Wash | After Wash |
| Untreated Control | 100 | 118 | 116.4 | 239 | 252 |
| UF Resin only | 56.4 | 60.0 | 56.4 | 45 | 39 |
| UF Resin-PEA elastomer | 60.7 | 67.2 | 63.9 | 184 | 211 |

[1] Monsanto wrinkle recovery test.
[2] Elmendorf tear test.
[3] Mullen burst test.
[4] Taber abraser with CS-10 calibrase wheels.

When the same sample is treated with only the elastomer, very little if any improvement in wrinkle recovery was observed over the untreated control. Moreover, the residual tear strength of the sample treated with only the elastomer was poorer than the control. It, thus, is apparent that retention of wrinkle recovery can be achieved by using a resin in conjunction with an elastomeric polymer as shown by the present invention. Moreover, it is quite apparent that the strength and abrasion resistance of the material has been greatly improved as compared to a composition using a resin only.

EXAMPLE II

The method of Example II was the same as Example I, above. However, the fabric treating composition contained a terpolymer of 50 parts of vinyl chloride, 25 parts of vinylidene chloride, 25 parts of 2-ethyl hexyl acrylate instead of polyethyl acrylate. The amounts of the other components were essentially the same as Example I. After test, the results are shown below:

The pickup on the fabric was 13.7% solids, the residual breaking strength of the fabric was 57.3% on the warp and 60.8% on the filling. The wrinkle recovery before washing was 124° on the warp and 132° on the filling and after washing it was 132° on the warp and 130° on the filling. The residual tear strength of the material was 37.9% on the warp and 33.3% on the filling before washing; after washing it was 38% on the warp and 33.3% on the filling. There was no shrinkage of the material. The residual bursting strength was 65.5% before washing, 67.3% after washing and 60.0% after being treated with hypochlorite solution. The abrasion resistance before washing was 289 cycles and after washing was 274 cycles. This example illustrates that the internally plasticized vinyl chloride polymers can be used to obtain satisfactory results as disclosed above.

Still other compositions were used to treat samples in a manner similar to that set forth in Example II above except that the elastomeric polymers used were: (1) a terpolymer of 40 parts vinyl chloride, 30 parts vinylidene chloride and 30 parts 2-ethyl hexyl acrylate, (2) a terpolymer of 52 parts of vinyl chloride, 45 parts of 2-ethyl hexyl acrylate and 3 parts of acrylic acid, and (3) a terpolymer of 46 parts of vinyl chloride, 27 parts of vinylidene chloride and 27 parts of 2-ethyl hexyl acrylate, all parts being by weight. The compositions provided results similar to those shown in Example II but the hand of the fabric was better.

In summary, the present invention teaches that crease-resistance fabrics having good wrinkle recovery, tear strength, bursting strength and abrasion resistance can be obtained by employing an elastomeric polymer such as one of the polyacrylates or an internally plasticized vinyl chloride polymer with a conventional urea or melamine-formaldehyde or other amide-aldehyde resin.

I claim:

1. A composition of matter comprising a dispersion of water and solids, said solids comprising essentially a mixture of (1) from about 25 to 55 parts by weight of a curable resin of an urea compound and an aldehyde, and (2) from 75 to 45 parts by weight of an elastomeric internally plasticized vinyl halid copolymer and a catalyst for said resin, said water being present in an amount sufficient to form a dispersion.

2. A composition of matter according to claim 1 in which said resin comprises a urea-formaldehyde resin.

3. A composition of matter according to claim 2 in which said elastomeric polymer comprises a terpolymer of from 40 to 52 parts vinyl chloride, 25 to 30 parts vinylidene chloride and the remainder 2-ethyl-hexyl acrylate.

4. A composition of matter according to claim 2 in which said polymeric elastomer comprises a terpolymer of about 52 parts vinyl chloride, about 45 parts 2-ethyl-hexyl acrylate, and about 3 parts acrylic acid.

5. The method which comprises applying to a textile fabric of cotton an aqueous dispersion of water and solids, said solids comprising essentially a mixture of (1) a curable resin of an urea compound and an aldehyde and (2) an elastomeric internally plasticized vinyl halide copolymer, the ratio of said resin to said copolymer being from about 50:50 to 30:70 parts by weight on a dry solids basis, a catalyst for said resin and a dispersing agent, said water being present in an amount sufficient to form a dispersion, and in an amount sufficient to deposit from about 8 to 15% by weight of solids on said fabric, removing water from said treated fabric, heating the same to cure said resin, and washing and again drying said treated fabric.

6. The method according to claim 5 in which in said composition said resin comprises an urea-formaldehyde resin.

7. The method according to claim 5 in which in said composition said resin comprises a urea-formaldehyde resin and said elastomeric polymer comprises a terpolymer of from 40 to 52 parts vinyl chloride, 25 to 30 parts vinylidene chloride and the remainder 2-ethyl-hexyl acrylate.

8. The method according to claim 5 in which in said composition said resin comprises a urea-formaldehyde resin and said elastomeric polymer comprises a terpolymer of about 52 parts vinyl chloride, about 45 parts 2-ethyl-hexyl acrylate and about 3 parts acrylic acid.

9. The method which comprises applying to a textile material selected from the group consisting of cotton, rayon, wool and nylon an aqueous dispersion of water and solids, said solids comprising essentially a mixture of (1) a curable resin of an urea compound and an aldehyde and (2) an elastomeric internally plasticized vinyl halide copolymer, the ratio of said resin to said elastomeric copolymer being from about 25:75 to 55:45 parts by weight on a dry solids basis and a catalyst for said resin, said water being present in an amount sufficient to form a dispersion, and in an amount sufficient to deposit from about 5 to 20% by weight total solids on said textile material and heating said treated textile material to cure said resin.

10. An article of manufacture comprising a textile base material selected from the group consisting of cotton, rayon, wool and nylon containing from about 5 to 20% by weight on the material of a fused, crease-resistant, wrinkle recovery, strength imparting, and abrasion resistant textile finishing composition comprising essentially from about 25 to 55 parts by weight of a curable resin of an urea compound and an aldehyde and from about 75 to 45 parts by weight of an elastomeric internally plasticized vinyl halide copolymer.

11. An article of manufacture comprising a textile base material of cotton containing from about 8 to 15% by weight on the material of a fused composition comprising essentially from about 30 to 50 parts by weight of a curable resin of an urea compound and an aldehyde and from about 70 to 50 parts by weight of an elastomeric internally plasticized vinyl halide copolymer.

12. An article of manufacture according to claim 11 wherein in said composition said resin comprises a urea-formaldehyde resin.

13. An article of manufacture according to claim 12 wherein in said composition said elastomeric polymer comprises a terpolymer of from 40 to 52 parts vinyl chloride, 25–30 parts vinylidene chloride and the remainder 2-ethyl-hexyl-acrylate.

14. An article of manufacture according to claim 12 wherein in said composition said elastomeric polymer comprises a terpolymer of about 52 parts vinyl chloride, about 45 parts 2-ethyl-hexyl-acrylate and about 3 parts acrylic acid.

References Cited in the file of this patent

UNITED STATES PATENTS

| | | |
|---|---|---|
| 2,295,699 | Thackston | Sept. 15, 1942 |
| 2,299,786 | Battye et al. | Oct. 27, 1942 |
| 2,536,050 | Fluck | Jan. 2, 1951 |
| 2,563,897 | Wilson | Aug. 14, 1951 |
| 2,662,867 | Hoertz | Dec. 15, 1953 |
| 2,725,308 | Nickerson | Nov. 29, 1955 |
| 2,787,603 | Sanders | Apr. 2, 1957 |
| 2,864,093 | Sumner et al. | Dec. 16, 1958 |

FOREIGN PATENTS

| | | |
|---|---|---|
| 625,215 | Great Britain | June 23, 1949 |

UNITED STATES PATENT OFFICE
CERTIFICATE OF CORRECTION

Patent No. 2,987,421                              June 6, 1961

Neil H. Sherwood

It is hereby certified that error appears in the above numbered patent requiring correction and that the said Letters Patent should read as corrected below.

Column 3, line 57, for "about" read -- above --.

Signed and sealed this 12th day of June 1962.

(SEAL)
Attest:

ERNEST W. SWIDER                              DAVID L. LADD
Attesting Officer                                Commissioner of Patents